US012787917B2

(12) United States Patent
Dighton et al.

(10) Patent No.: US 12,787,917 B2
(45) Date of Patent: Nov. 10, 2026

(54) SYSTEM TO ADJUST THE PHASING OF CHOPPER BLADES FOR A SUGARCANE HARVESTER

(71) Applicant: DEERE & COMPANY, Moline, IL (US)

(72) Inventors: John A. Dighton, Napoleonville, LA (US); Guy Burch, Thibodaux, LA (US); Herman E. Kelwaski, Lancaster, SC (US)

(73) Assignee: Deere & Company, Moline, IL (US)

( * ) Notice: Subject to any disclaimer, the term of this patent is extended or adjusted under 35 U.S.C. 154(b) by 392 days.

(21) Appl. No.: 18/429,652

(22) Filed: Feb. 1, 2024

(65) Prior Publication Data

US 2024/0292780 A1 Sep. 5, 2024

Related U.S. Application Data

(60) Provisional application No. 63/449,077, filed on Mar. 1, 2023.

(51) Int. Cl.
*A01D 34/73* (2006.01)
*A01D 41/127* (2006.01)
*A01D 45/10* (2006.01)

(52) U.S. Cl.
CPC ......... *A01D 34/73* (2013.01); *A01D 41/1271* (2013.01); *A01D 45/10* (2013.01)

(58) Field of Classification Search
CPC ..... A01D 34/73; A01D 41/1271; A01D 45/10
See application file for complete search history.

(56) References Cited

U.S. PATENT DOCUMENTS

| | | | | |
|---|---|---|---|---|
| 6,076,340 A * | 6/2000 | Fowler | A01D 45/10 | 56/13.3 |
| 6,926,604 B2 * | 8/2005 | Weber | A01D 41/1274 | 460/6 |
| 10,278,332 B2 | 5/2019 | Burch | | |
| 2013/0111871 A1 * | 5/2013 | Hinds | B02C 18/18 | 56/500 |
| 2013/0116894 A1 * | 5/2013 | Perez-Iturbe | A01D 45/10 | 701/50 |
| 2015/0181804 A1 * | 7/2015 | Arndt | A01D 45/10 | 56/11.9 |

(Continued)

*Primary Examiner* — William D Hutton, Jr.
*Assistant Examiner* — Jose A. Martinez
(74) *Attorney, Agent, or Firm* — Taft Stettinius & Hollister LLP; Stephen F. Rost

(57) ABSTRACT

A sugarcane harvester to cut sugarcane from a sugarcane field including a chopping system. The chopping system includes a first chopper having a plurality of first blades and a second chopper having a plurality of second blades, wherein the first chopper and the second chopper rotate about their respective axes of rotation to cooperatively cut sugarcane stalk into billets. A motor operatively connected to the first chopper and to the second chopper rotates the first chopper and the second chopper. A chopper timing actuator is configured to continuously adjust a time of interference between a first blade of the plurality of first blades with respect to a second blade of the plurality of second blades, wherein the continuous adjustment maintains a time period of the interference between the first blade and the second blade as the first chopper and the second chopper cut the sugarcane stalk into billets.

18 Claims, 6 Drawing Sheets

(56) References Cited

U.S. PATENT DOCUMENTS

| | | | | |
|---|---|---|---|---|
| 2016/0073580 | A1* | 3/2016 | Scrivner | A01D 45/10<br>701/50 |
| 2016/0235010 | A1* | 8/2016 | Fattepur | A01F 29/06 |
| 2018/0092306 | A1* | 4/2018 | Burch | A01D 45/10 |
| 2018/0125005 | A1* | 5/2018 | Lawn | A01F 29/09 |
| 2021/0329840 | A1* | 10/2021 | Craig | A01D 45/10 |
| 2023/0243761 | A1* | 8/2023 | Somarowthu | A01F 15/08<br>701/50 |
| 2023/0301237 | A1* | 9/2023 | Malani | A01D 45/10 |

* cited by examiner

SYSTEM TO ADJUST THE PHASING OF CHOPPER BLADES FOR A SUGARCANE HARVESTER

CROSS-REFERENCE TO RELATED APPLICATION

This application claims priority to Provisional Patent Application Ser. No. 63/449,077, having the title "System to Adjust the Phasing of Chopper Blades for a Sugarcane Harvester" filed Mar. 1, 2023, the disclosure of which is incorporated herein by reference in its entirety.

FIELD OF THE DISCLOSURE

The present disclosure generally relates to a harvesting machine, and more particularly to a system and method for adjusting the phasing of chopper blades for a sugarcane harvester.

BACKGROUND

Harvesters of various configurations, including sugarcane harvesters, have harvesting systems of various types. Harvesting systems for a sugarcane harvester, for example, include assemblies or devices for cutting, chopping, sorting, transporting, and otherwise gathering and processing sugarcane plants. Typical harvesting assemblies, in different implementations, include a base cutter assembly (or "base cutter"), feed rollers, and cutting drums, also known as choppers.

To actively harvest crops, the sugarcane harvester gathers and processes material from rows of sugarcane plants. In the case of one type of sugarcane harvester, the gathered sugarcane stalks are cut into billets that move through a loading elevator to an elevator discharge, where the cut sugarcane billets are expelled to a collector, such as the sugarcane wagon. Leaves, trash, and other debris are separated from the billets and ejected onto the field.

In various harvesters, harvesting assemblies are hydraulically powered by an engine-driven pump or electrically powered by a generator or other electrical power supply. The harvesting assemblies include feed rollers that move the cut stalks towards two rotating drums of a chopper system. The rotating drums each include a plurality of blades. As the rotating drums rotate in opposite directions, the blades interact to cut the harvested sugarcane stalks into longitudinal segments called "billets."

Corresponding blades of the rotating drums cooperate to compressively cut the stalk into billets. The angular position of one drum may be adjusted relative to the other drum to adjust the timing of operation of the rotating drums (e.g., each drum can be manually angularly adjusted).

SUMMARY

In one implementation, there is provided a chopping system for a crop harvester including a first chopper having a first axis of rotation, wherein the first chopper includes a plurality of first blades extending from the first axis of rotation. A second chopper includes a second axis of rotation, wherein the second chopper includes a plurality of second blades extending from a second axis of rotation. The first chopper and the second chopper rotate about their respective axes of rotation to cooperatively cut sugarcane stalk into billets. A motor is operatively connected to the first chopper and to the second chopper, wherein the motor rotates the first chopper and rotates the second chopper. A chopper timing actuator is configured to continuously adjust an interference between a first blade of the plurality of first blades with respect to a second blade of the plurality of second blades, wherein the continuous adjustment maintains the interference between the first blade and the second blade as the first chopper and the second chopper cut the sugarcane stalk into billets.

In some implementations the chopping system further includes a chopper speed sensor located at the first chopper, wherein the chopper speed sensor identifies a change in a rotational speed of the first chopper as the first chopper and the second chopper cut the sugarcane stalk into billets.

In some implementations the chopping system further includes a controller operatively connected to the chopper speed sensor and to the chopper timing actuator, wherein the controller transmits a chopper timing signal to adjust the chopper timing actuator in response to the identified rotational speed of the first chopper.

In some implementations the chopping system further includes an electric motor operatively connected to the controller and to the chopper timing actuator, wherein the chopper timing signal is transmitted to the electric motor to adjust the chopper timing actuator to maintain the interference between the first blade and the second blade.

In some implementations the chopping system further includes wherein the chopper speed sensor transmits a rotational speed signal of the identified rotational speed and wherein the rotational speed signal identifies a deceleration of the rotational speed of the first chopper during interference between the first blade and the second blade.

In some implementations the chopping system further includes wherein the deceleration identifies a time period during which the first blade contacts the second blade.

In some implementations the chopping system further includes wherein the controller compares the time period of deceleration with a threshold time period and in response to the comparison transmits the timing chopper signal to the electric motor.

In some implementations the chopping system further includes a crop feed flow sensor operatively connected to the controller, wherein the crop feed flow sensor identifies a flow of crop moving to the first and second chopper.

In some implementations the chopping system further includes wherein the controller adjusts the threshold time period based on the amount of flow of crop to adjust the timing chopper signal and based on the amount of crop flow and the deceleration.

In some implementations the chopping system further includes a hydraulic pressure supply sensor operatively connected to the controller, wherein the hydraulic pressure supply sensor identifies a hydraulic pressure of a hydraulic supply coupled to the motor.

In some implementations the chopping system further includes wherein the controller adjusts the threshold time period based on the hydraulic pressure to adjust the timing chopper signal based on the hydraulic pressure and the deceleration.

In another implementation there is provided a method of harvesting sugarcane from a sugarcane field using a sugarcane harvester. The method includes: cutting sugarcane from the sugarcane field; moving the cut sugarcane to a chopping system; chopping the cut sugarcane into billets with the chopping system having a first chopper having first blades and a second chopper having second blades, wherein the first chopper and the second chopper are coupled together by a gear train driven by a motor; and adjusting an angular displacement between the first chopper and the second chopper to increase an interference between a first blade of the first blades and a second blade of the second blades, wherein the interference between the first blade and the second blade is adjusted continuously while harvesting sugarcane.

In some implementations the method further includes identifying a reduction in motor speed of the motor for determining an amount of the interference between the first blade and the second blade.

In some implementations the method further includes wherein the identifying the reduction in motor speed includes sensing motor speed with a sensor transmitting a signal to a controller.

In some implementations the method further includes wherein the signal identifies a time period of interference between the first blade and the second blade.

In some implementations the method further includes comparing, with the controller, the time period of interference with a threshold and adjusting the angular displacement based on the comparison.

In a further implementation there is provided a sugarcane harvester to cut sugarcane from a sugarcane field. The harvester includes a feed system to move the cut sugarcane to a chopping system, wherein the chopping system include a first chopper having first chopper blades and a second chopper having second chopper blades. A gearset is operatively connected to the first chopper and to the second chopper. A motor is operatively connected to the gearset. A sensor is operatively connected to the chopping system, wherein the sensor generates a speed signal to identify a rotational speed of one of the motor, the first chopper, or the second chopper. A controller is operatively connected to the sensor, wherein the controller receives the speed signal and compares the speed signal to a threshold. A chopper timing actuator is operatively coupled to the gearset, wherein the controller continuously controls the chopper timing actuator to adjust an angular displacement between the first chopper and the second chopper based on the comparison of the speed signal to the threshold.

In some implementations the sugarcane harvester further includes wherein the speed signal identifies a deceleration of the rotational speed of the first chopper during an interference between a first blade of the first chopper and a second blade of the second chopper.

In some implementations the sugarcane harvester further includes wherein the deceleration identifies a time period during which the first blade interferes with the second blade.

In some implementations the sugarcane harvester further includes wherein the controller compares the time period of deceleration with a threshold time period and in response to the comparison transmits a timing chopper signal to the electric motor.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

DETAILED DESCRIPTION

Figure 1:
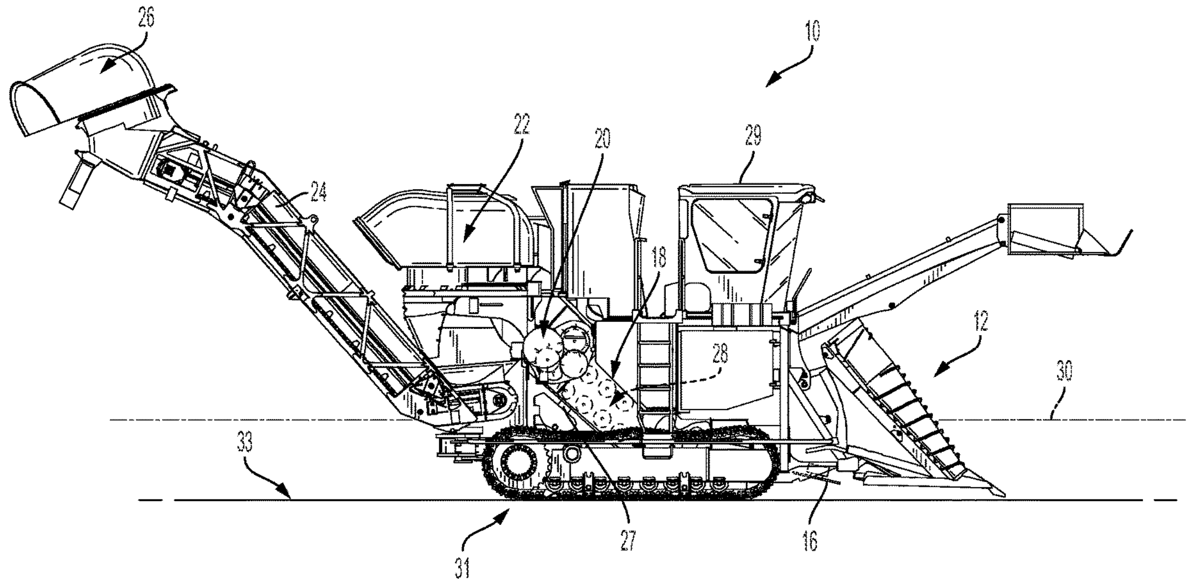
FIG. 1 is a side elevational view of a work vehicle, and more specifically, of an agricultural vehicle such as a sugarcane harvesting machine.

For the purposes of promoting an understanding of the principles of the novel disclosure, reference will now be made to the implementations described herein and illustrated in the drawings and specific language will be used to describe the same. It will nevertheless be understood that no limitation of the scope of the novel disclosure is thereby intended, such alterations and further modifications in the illustrated devices and methods, and such further applications of the principles of the novel disclosure as illustrated therein being contemplated as would normally occur to one skilled in the art to which the novel disclosure relates.

Referring to FIG. 1, a harvester 10 is configured to harvest a stalk crop. Illustratively, the crop harvester 10 is a sugarcane harvester. For example, the harvester 10 comprises a left crop divider 12 and a right crop divider 12 (only the one crop divider 12 being shown), an upper knockdown roller and a lower knockdown roller (the knockdown rollers are not shown), a left basecutter 16 and a right basecutter 16 (only the one basecutter 16 being shown), a feed system 18, a chopping system 20, a primary extractor 22, an elevator 24, and a secondary extractor 26. The left and right crop dividers 12 are configured to contact the crop so as to lean it forward. The left and right basecutters are configured to sever the stalk of the crop knocked down by the knockdown rollers at a location near the ground. The feed system 18 includes a number of feed rollers 28 and is configured to receive from the basecutters 16 a mat of severed crop material and to feed the mat toward the feed system 18. A crop feed flow sensor 27 is located at the feed system 18 to identify an amount of crop or a flow of crop moving to the chopping system 20.

The chopping system 20 is configured to receive the mat from the feed system 18 and to cut the crop stalk into billets. The primary extractor 22 is positioned downstream from the chopping system 20 and is configured to separate crop residue (e.g., leafy material) from the billets and expel the crop residue from the crop harvester 10. The elevator 24 is positioned at the rear of the machine to receive the cleaned flow of billets and is configured to convey the billets to an elevated position where they are discharged into a bin or container to be hauled away. The secondary extractor 26 is positioned near the top of the elevator 24 and is configured to further separate crop residue from the billets and to remove the crop residue from the crop harvester 10. Terms such as left and right are relative to a central fore-aft axis 30 of the harvester 10.

The harvester 10 comprises an operator's station 29, i.e. cab, and traction elements 31. A human operator can operate the harvester 10 from the operator's station 29. The traction elements 31 are positioned on the left and right sides of the harvester 10 for engaging the ground 33 and propelling the harvester 10. Each traction element 31 may be, for example, a track unit or a ground-engaging wheel (e.g., one track unit on each side of the harvester 10 as shown with respect to the right side in FIG. 1). Autonomous or self-driving harvesters are also contemplated.

Figure 2:
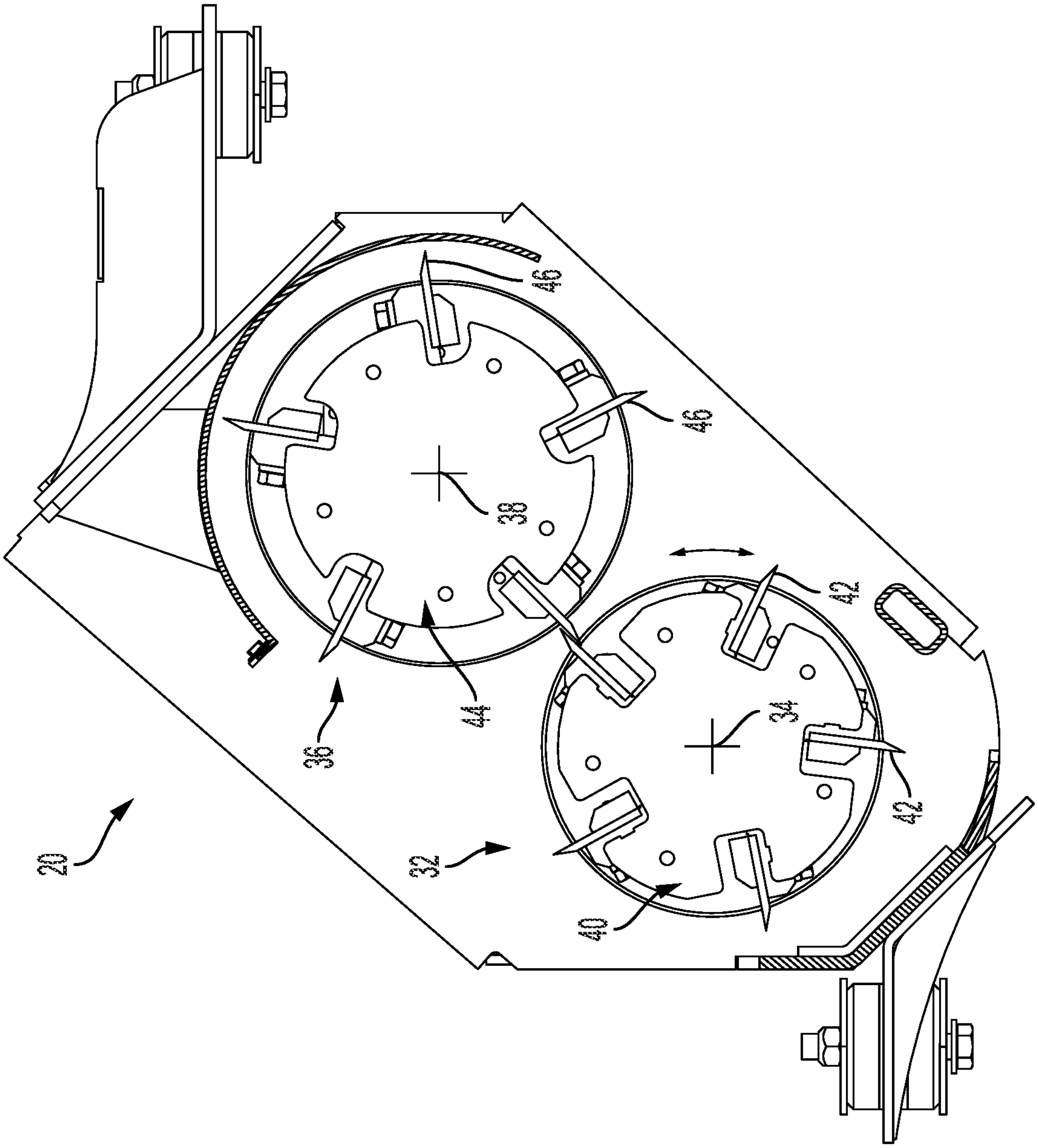
FIG. 2 is an end elevation view showing first and second choppers of a chopping system.

Referring to FIG. 2, the chopping system 20 comprises a first chopper 32 having an axis of rotation 34 and a second chopper 36 having an axis of rotation 38. The first chopper 32 comprises a drum 40 mounted for rotation about the axis of rotation 34 and a plurality of blades 42 mounted to the drum 40 and spaced evenly about the periphery of the drum 40 for rotation about the axis 34. The second chopper 36 comprises a drum 44 mounted for rotation about the axis of rotation 38 and a plurality of blades 46 mounted to the drum 44 and spaced evenly about the periphery of the drum 44 for rotation about axis 38.

The first and second choppers 32 and 36 are configured to rotate about their respective axes of rotation 34, 38 to cooperatively cut crop stalk into billets. As the choppers 32 and 36 rotate, corresponding blades 42 of the choppers 32 blades 46 of chopper 36 cooperate to compressively cut the crop stalk into billets.

Figure 3:
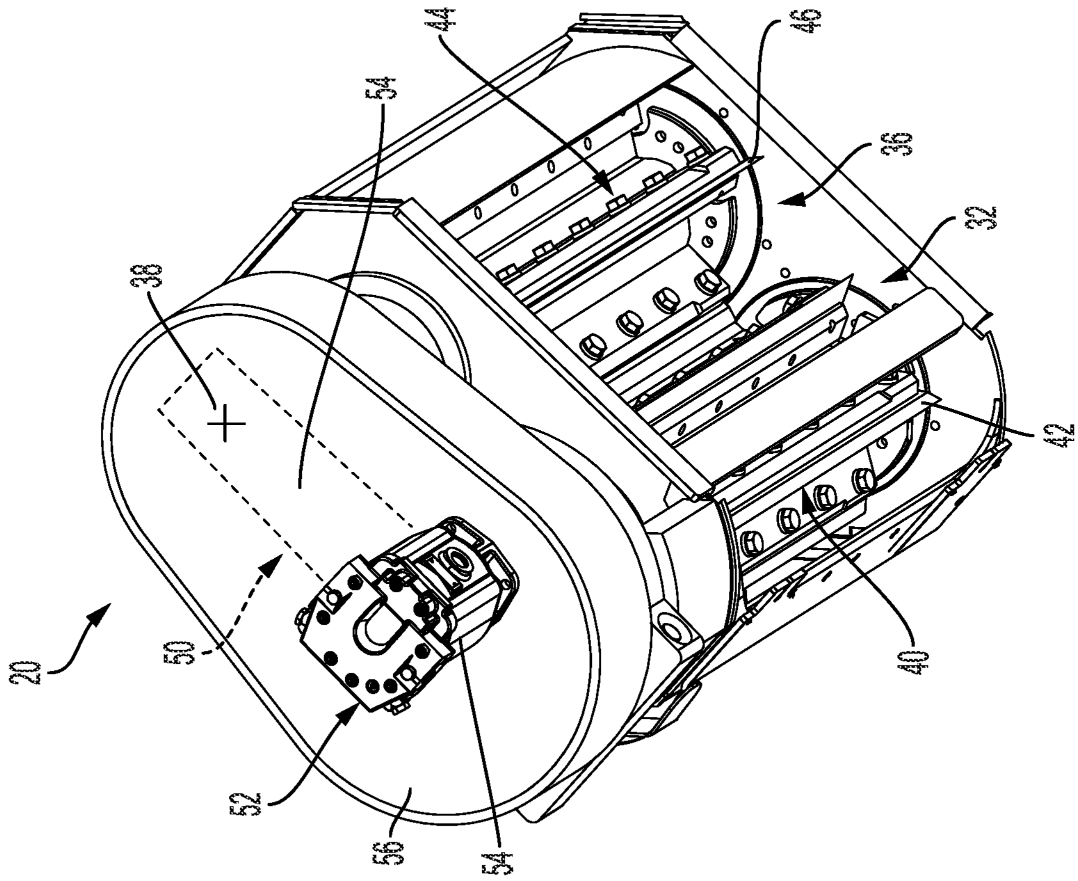
FIG. 3 is a perspective view of a chopping system.

As seen in FIG. 3, the chopping system 20 comprises a chopper drive 50 configured to drive rotation of the choppers 32, 36. The chopper drive 50 includes a motor 52 (e.g., a hydraulic motor) and a gearset 54, the location of which is identified in dotted outline. The motor 52 includes a motor body 54 mounted and positioned external to a housing 56. The gearset 54 is located between the housing 56 and the choppers 32 and 36. A motor shaft (not shown) of motor 52 extends through the housing 56 and is coupled to the chopper 32 to drive the chopper 32 as well as the gearset 54. The gearset 54 extends from the spindle of motor 52 to the chopper 36 and drives the chopper 36 in response to actuation of the motor 52. In one implementation, the gearset 54 includes a tone wheel and a sensor for the tonewheel to identify motor speed or drum speeds as is understood by one skilled in the art.

The chopping system 20 includes the following two purposes: 1) chopping stalk into billets; and 2) aiding in cleaning and feeding of the billets for later use. The chopper system functions with rotating drums 40 and 44 each having an equal number of blades 42, 46 affixed to the respective drums and extending from the drum's axis of rotation. One blade tip of one blade from a first drum hits a flat part of another blade on a second drum as the choppers rotate. In one implementation, one chopper is provided with motive power by the motor 52 and the motive power is transferred to the second chopper by gears resulting in identical rotational speed that is phased relative to the other. In one implementation, a pair of gears of the same diameter are used. The phase between the rotating drums 40 and 44 controls how much interference each blade on one drum has with a blade on the other drum. The degree of interference when opposed blades make contact is described as the chopper timing.

The rotation of chopper 32 is timed with respect to the rotation of chopper 36 to ensure that the blades of chopper 32 contact the blades of chopper 36 and to provide an interference between opposing blades of different drums. To reach a predetermined interference for acceptable billet production, an angular displacement between chopper 32 and chopper 36 is adjusted, if necessary, to establish the phase between drums and to achieve the predetermined interference. By adjusting the interference between blades, the cutting of billets by the chopping system 20 is improved. Chopper timing between chopper 32 and chopper 36 is determined, in one implementation, by monitoring the rotational speed of the chopper motor 52, which in turn determines the rotational speed of both chopper 32 and chopper 36. The chopper motor 52 is selected to have sufficient power to drive each of the chopper drums 40 and 44 to cut billets. As is understood by one skilled in the art, the chopper motor 52 is selected to meet the power requirements of the system. By selection of the proper motor, interference of the chopper blades primarily affects rotational speed of the drums 40 and 44 more than any other factors, such as crop characteristics or the flow of crop.

Figure 4:
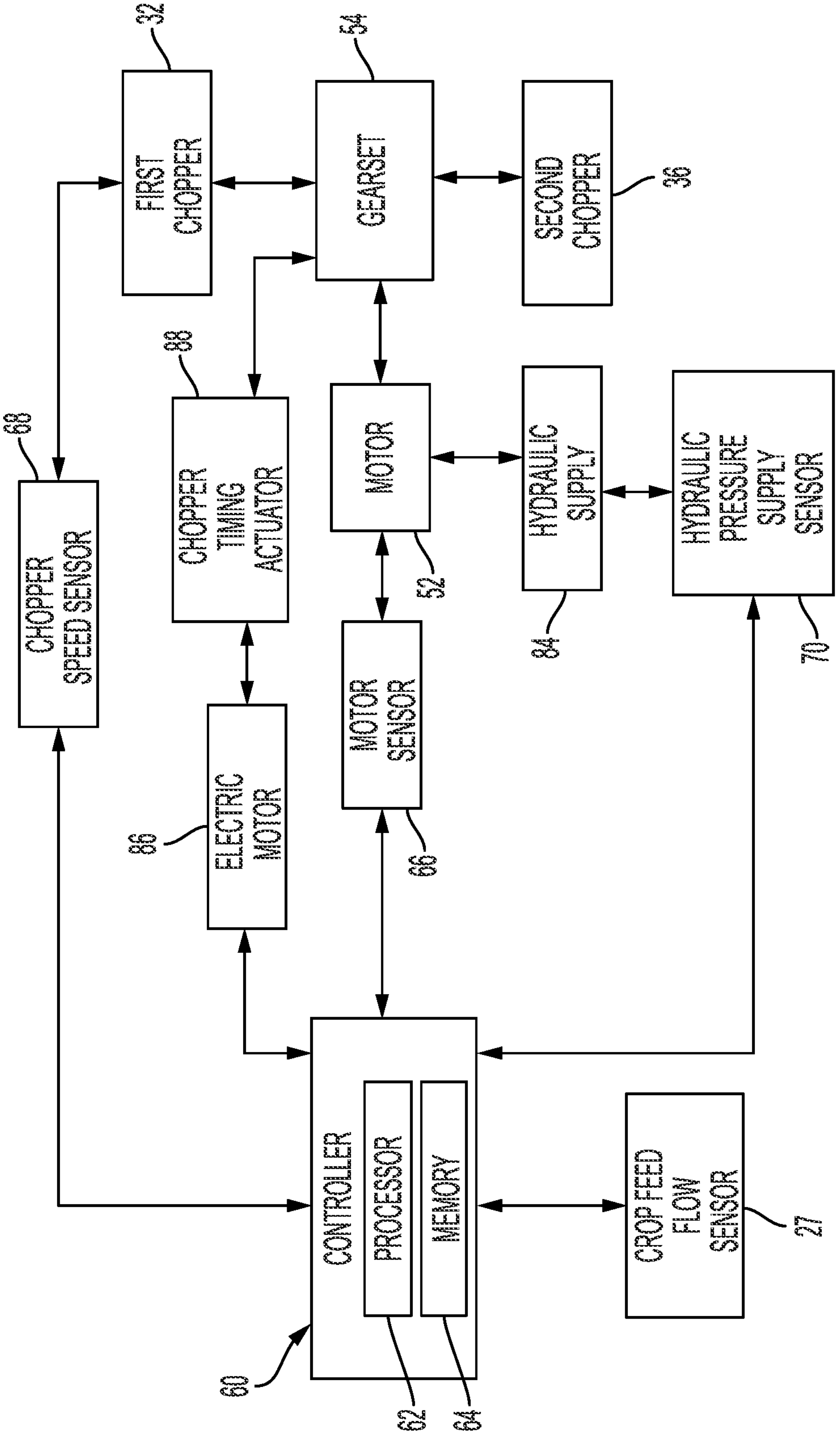
FIG. 4 is a block diagram of control system for the chopping system.

In one implementation, to identify an occurrence blade interference, the rotational speed of one of or both of the choppers 32 and 36 is monitored in real time by a chopper controller 60 of FIG. 4 that includes a processor 62 and a memory 64. The memory 64 can be internal to the processor 62 or external to the processor(s) 62. The controller 60, including the processor 62 and memory 64, is located on the vehicle 10 is located in a cloud system, also known as the "cloud", where the processor or the memory or both are located in the "cloud" at a location distant from the harvester to provide the stored information wirelessly to the controller 60. When referring to the controller 60, the processor 62, and the memory 64, other types of controllers, processors, and memory are contemplated. The controller 60 executes or otherwise relies upon computer software applications, components, programs, objects, modules, or data structures, etc. Software routines resident in the memory are executed in response to the signals received from a plurality of sensors, including a motor sensor 66, a chopper speed sensor 68, a hydraulic pressure supply sensor 70, and the crop feed flow sensor 27. One or more of the sensors, in different implementations, provides signals to the controller 60 to identify the status of the chopping system 20 including identifying a state of a device or a state of a structure of the vehicle 10. In one implementation, the motor sensor 66 is a rotary encoder.

As the chopper blades interfere, the rotational speeds of the choppers 32 and 36 decrease in response to the interference of each pair of opposed blades. The interference also reduces the rotational speed of the motor 52 experienced under the increased load. In one implementation, a time period identified during the reduction in rotational speed, the time of interference is quantified. Using the measured time period, an angular displacement, i.e. the phase, between choppers 32 and 36 is adjusted, if necessary.

In another implementation, the rate of change for transitions between blade contact and no blade contact are used to identify the chopper blade interference. As the blades begin to interfere, i.e., swiping, the rotational speed of the drums sharply decelerates during blade contact, and then accelerate once swiping has ended. Every time the blades initially contact each other, i.e., a swipe, the rotational speed of the drums slows and the intensity of the signal identifying contact, i.e. signal pulses, suddenly increases. As blade contact diminishes, the intensity of the signal identifying contact is reduced. Since the load on the motor is reduced as blades become disengaged, the rotational speed of the drums speeds up. During this transition from blade contact to no blade contact, the intensity of the signal pulses, which initially increase, now decrease at a rate of change that is less than a rate of change for the increase. The rate of change of the signal, therefore, is used to identify duration of blade contact.

An identification of the rate of change in the signal at the point of blade contact and after is monitored and is used to adjust the angular displacement of the drums. Consequently, not only does the "time period" of each blade contact exceed some time period of blade noncontact, the intensity of blade contact and its rate of change exceeds a known intensity of level of blade noncontact every time a blade swipes. In one or more implementations, identification of time periods is used to adjust angular displacement, identification of rates of change is used to adjust angular displacements, or both are used in combination to adjust angular displacements. In other implementations, the system identifies one of a duration of a change in rotational speed of the drums, an acceleration in the rotational speed of the drums, or a deceleration in the rotational speed of the drums.

Figure 5:
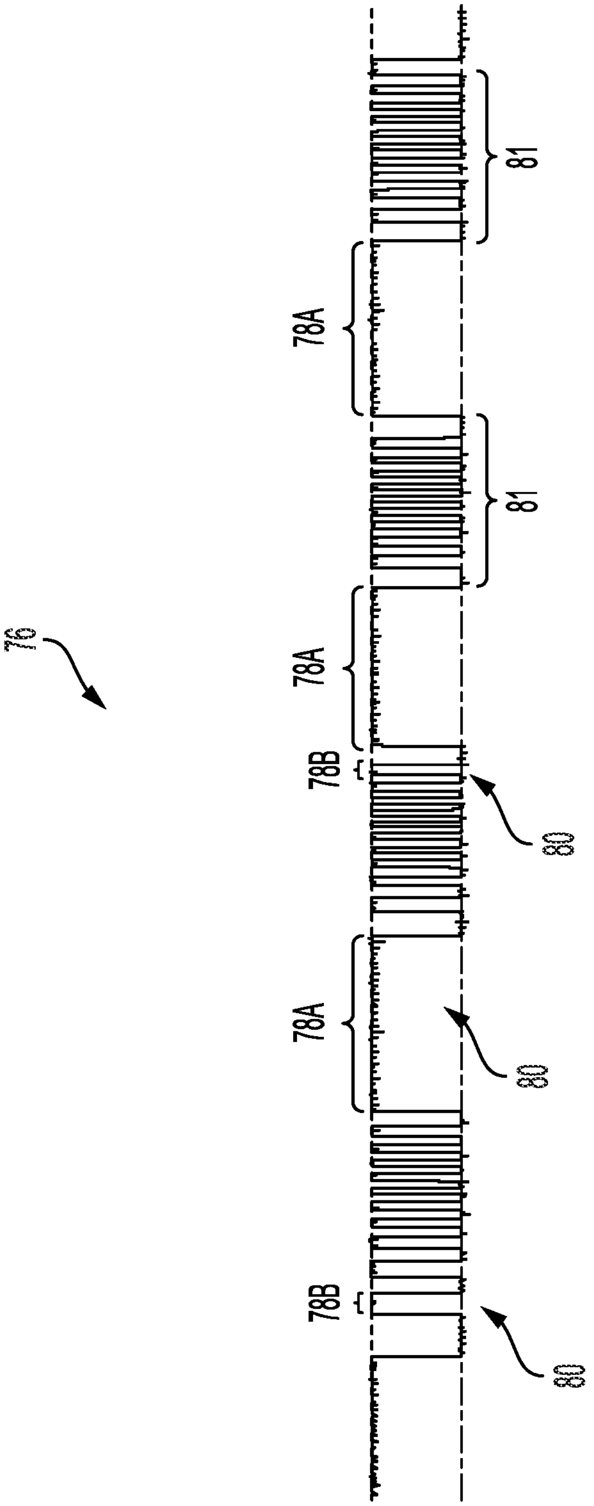
FIG. 5 illustrates a timing signal of a motor.

As seen in FIG. 5, in one implementation, the controller 60 receives an electronic signal 76, from the motor sensor 66 of FIG. 4. The signal 76 identifies the rotational speed of the motor while the blades interfere or while the blades are not in interference. The signal 76 includes a plurality of pulse each of which includes a time period. A time period 78 of each pulse 80 is generated by the speed motor sensor 66 which identifies the rotational speed of the motor 52. The width of the time period 78 is identified by the controller 60 and is used to identify the time period of interference. Each time period 78 corresponds to the amount of time of interference between opposing blades. Using the time periods, a deceleration caused by each interference of the blades is identified by the controller 60. For instance, the time periods of 78A are greater than the time periods 78B and indicate a blade interference occurs at periods 78A. The length of the time period 78A indicates a time period of deceleration of the motor resulting from blade interference. Once the interference between opposing blades no longer takes place, the rotational speed of the motor 52 increases, i.e. accelerates, for instance at time periods 78B. As can be seen, the time period of pulses 81 appearing before and after pulses 80, having time periods 78, becomes smaller indicating the rotational speed of the motor 52 increases in response to a lack of blade interference. In different implementations, the rotational speed of the motor is monitored continuously throughout at least one revolution of the choppers 32 and 36. In other implementations, the rotational speed of the motor is identified continuously during a harvesting operation. In this case, continuously means provided without interruption.

While a motor sensor 66 is described to identify a slowing of the rotational speed of the motor 52 and to identify blade interference, other implementations include the use of other types of sensors to determine blade interference. For instance, in one implementation, a speed sensor is located at the gearset 54 to identify a rotational speed of a gear in the gearset, whose rotational speed is reduced during blade interference. In another implementation, a speed sensor is coupled to one or both of the drums 40 or 44 to identify drum rotational speed. In this implementation, a hall effect sensor is used to identity drum speed which correlates to a reduction in motor speed, and therefore the period of time of interference. In another implementation, an optical sensor is used to identify rotational speeds of the chopper 32 or chopper 36 or to identify a rotational speed of a gear in the gearset 54. In a further implementation, the motor 52 is a hydraulic motor driven by a hydraulic fluid supply 84. In this implementation, the hydraulic pressure supply sensor 70 identifies a change in the pressure of hydraulic fluid. The hydraulic pressure supply sensor 70 transmit a signal to the controller 60 which is used to identify blade interference.

Once the chopper timing intensity is known in real time, the controller 60 transmits a signal to an electronic motor 86 that drives a chopper timing actuator 88. The actuator 88 mechanically adjusts the timing, if necessary, continuously over a selected period of time, such as during a harvesting operation, by adjusting the angular displacement between the chopper 32 and the chopper 36.

Other onboard sensors are used in these and other implementations for sensor fusion to prevent false detection of timing in instances where the identification of blade interference is affected and results in an overload of the chopper. For instance, under some circumstances the crop mat being fed to the chopper system 20 becomes larger than average and affects the rotation of the chopper 32 or the chopper 36. The larger crop mat is detected by the crop feed flow sensor 27. In this implementation, the signal 76 is affected by the larger crop mat due to the increase of load experience by the motor 52. Other events can also affect the load experienced by the motor. In these instances, the motor sensor 60 indicates a slowing down of the rotational speed of the motor not resulting from blade interference. To identify, the actual blade interference, the crop feed flow sensor 27 transmits a signal to the controller 60 indicating that a larger amount of crop is being fed to the chopper system 20. Such a slowing down of the motor in this case, however, would be more continuous over a longer period of time during complete rotations of the choppers and would be identified at time other the times of blade interference. In this implementation, the controller 60 compares the slowing down of the motor to a predetermined or known reduction in motor speed, e.g. revolutions per minute (RPM) resulting from crop flow to identify the time of blade interference.

In one or more implementations, the controller 60 adjusts the timing between opposing blades using different control methods such as a closed loop control based on the measured timing as well as feed forward control based on influencers of the chopper timing, such as the crop feed flow sensor 27.

Figure 6:
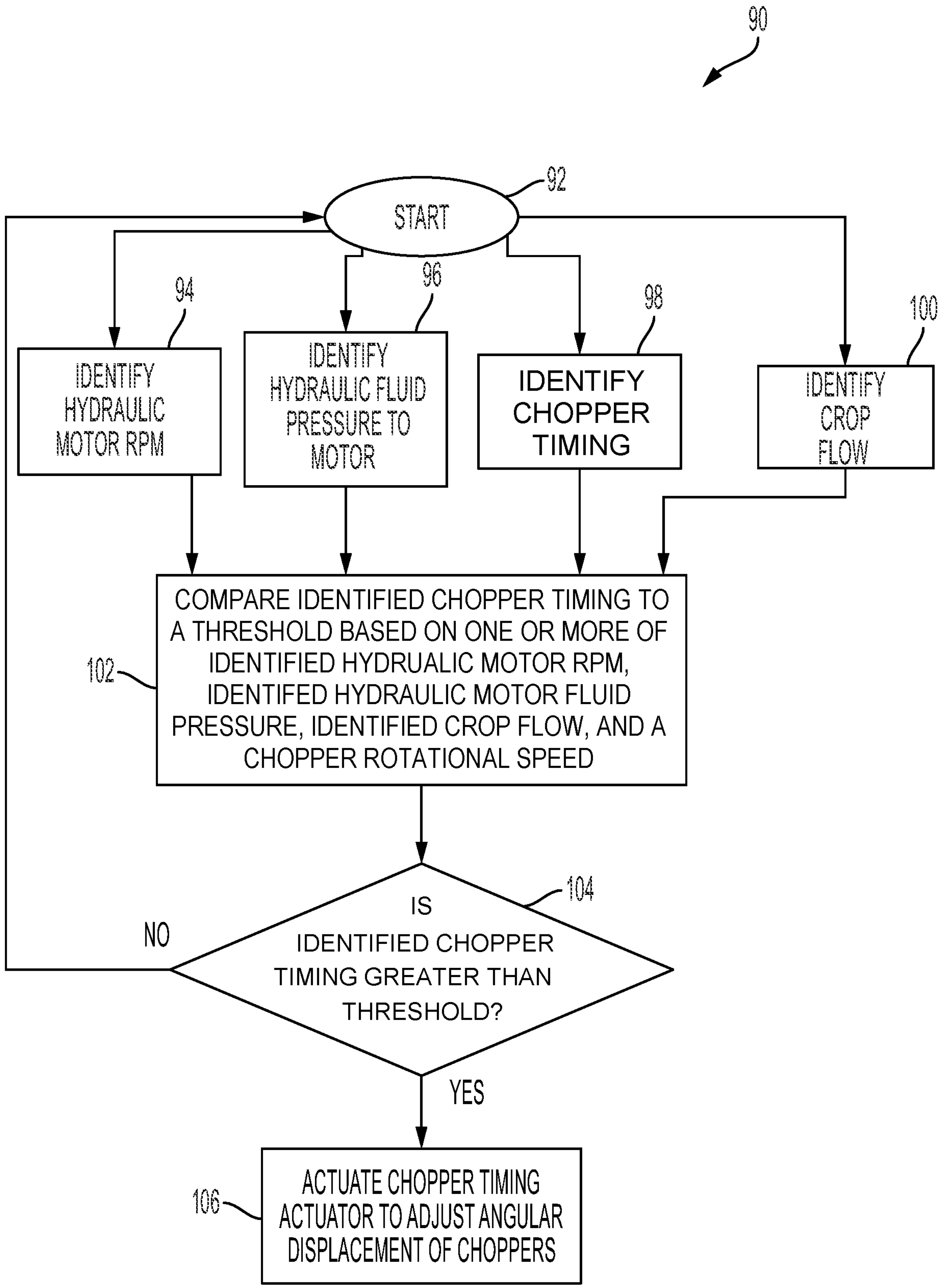
FIG. 6 illustrates a flow chart of a process to adjust an angular displacement of choppers.

FIG. 6 illustrates a process to adjust the angular displacement between the chopper 32 and the chopper 36. Once the process begins at start block 92, the controller 60 identifies one or more of the operating features of the chopper system 20. For instance, at block 94 the hydraulic motor RPM is identified. At block 96, the hydraulic fluid pressure is identified. At block 98, the chopper timing is identified, and at block 100 the crop flow is identified. Once one or more of the operating features are identified, the controller 60 at block 102 compares the identified chopper timing to a threshold. The threshold is based on a predetermined blade interference based on operating characteristics of the chopping system 20 to optimize billet production. The threshold is compared to features of the timing signal such as the signal received from one or more of the sensors identifying the hydraulic motor RPM, the hydraulic motor fluid pressure, the crop flow, chopper rotational acceleration, and the chopper rotational speed.

Once the comparison is made by the controller 60, the controller 60 determines whether the identified chopper timing is greater than or less than the threshold at block 104. If the chopper timing is greater than the threshold, the blade interference is insufficiently short to effectively cut the sugarcane stock into billets. If the controller determines that the chopper timing is greater than the threshold, then the chopper timing actuator is actuated at block 106 to adjust the angular displacement of the choppers. If however, the controller determines that the chopper timing is not greater than the threshold, the process returns to start block 92 to continue the process of determining whether the angular displacement of the choppers requires adjustment through the harvest.

In one implementation, the adjustment of the angular displacement between blades is made while the drums are not rotating by using a clutch which disengages the drums. In this case, an actuator is used to make the adjustment. In other implementations, the angular displacement is adjusted continuously as the drum rotate using a continuously variable transmission arrangement.

While the disclosure has been illustrated and described in detail in the drawings and foregoing description, such illustration and description is to be considered as an example and not restrictive in character, it being understood that an illustrative implementation has been shown and described and that all changes and modifications that come within the spirit of the disclosure are desired to be protected. It will be noted that alternative implementations of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

While exemplary implementations incorporating the principles of the present disclosure have been described hereinabove, the present disclosure is not limited to the described implementations. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A chopping system for a crop harvester comprising:
- a first chopper having a first axis of rotation, the first chopper including a plurality of first blades extending from the first axis of rotation;
- a second chopper having a second axis of rotation, the second chopper including a plurality of second blades extending from a second axis of rotation, wherein the first chopper and the second chopper rotate about their respective axes of rotation to cooperatively cut sugarcane stalk into billets;
- a motor operatively connected to the first chopper and to the second chopper, wherein the motor rotates the first chopper and rotates the second chopper;
- a chopper timing actuator configured to adjust an interference between a first blade of the plurality of first blades with respect to and a second blade of the plurality of second blades, wherein the adjustment maintains the interference between the first blade and the second blade as the first chopper and the second chopper cut the sugarcane stalk into billets;
- a chopper speed sensor configured to identify a change in a rotational speed of the first chopper as the first chopper and the second chopper cut the sugarcane stalk into billets; and
- a controller operatively connected to the chopper speed sensor and to the chopper timing actuator, wherein the controller transmits a chopper timing signal to adjust the chopper timing actuator and thereby adjust the interference in response to the identified change in the rotational speed of the first chopper.

2. The chopper system of claim 1 further comprising an electric motor operatively connected to the controller and to the chopper timing actuator, wherein the chopper timing signal is transmitted to the electric motor to adjust the chopper timing actuator to maintain the interference between the first blade and the second blade.

3. The chopper system of claim 1 wherein the chopper speed sensor transmits a rotational speed signal of the identified rotational speed, wherein the rotational speed signal identifies a deceleration of the rotational speed of the first chopper during interference between the first blade and the second blade.

4. The chopper system of claim 3 wherein the deceleration identifies a time period of deceleration during which the first blade contacts the second blade.

5. The chopper system of claim 4 wherein the controller compares the time period of deceleration with a threshold time period and in response to the comparison transmits the timing chopper timing signal to the electric motor.

6. The chopper system of claim 5 further comprising a crop feed flow sensor operatively connected to the controller, wherein the crop feed flow sensor identifies a flow of crop flow moving to the first and second chopper.

7. The chopper system of claim 6 wherein the controller adjusts the threshold time period based on the amount of flow of crop flow and adjusts the timing chopper timing signal based on an amount of crop flow and the time period of deceleration.

8. The chopper system of claim 5 further comprising a hydraulic pressure supply sensor operatively connected to the controller, wherein the hydraulic pressure supply sensor identifies a hydraulic pressure of a hydraulic supply coupled to the motor.

9. The chopper system of claim 8 wherein the controller adjusts the threshold time period based on the hydraulic pressure to adjust the timing chopper timing signal based on the hydraulic pressure and the time period of deceleration.

10. A method of harvesting sugarcane from a sugarcane field using a sugarcane harvester, the method comprising:
- cutting sugarcane from the sugarcane field;
- moving the cut sugarcane to a chopping system;
- chopping the cut sugarcane into billets with the chopping system including a first chopper having first blades and a second chopper having second blades, wherein the first chopper and the second chopper are coupled together by a gear train driven by a motor; and
- adjusting an angular displacement between the first chopper and the second chopper to increase or decrease an interference between a first blade of the first blades and a second blade of the second blades, wherein the interference between the first blade and the second blade is adjusted continuously while harvesting sugarcane.

11. The method of claim 10 further comprising identifying a reduction in motor speed of the motor for determining an amount of the interference between the first blade and the second blade.

12. The method of claim 11 wherein the identifying the reduction in motor speed includes sensing motor speed with a sensor transmitting a signal to a controller.

13. The method of claim 12 wherein the signal identifies a time period of interference between the first blade and the second blade.

14. The method of claim 13 further comprising comparing, with the controller, the time period of interference with a threshold and adjusting the angular displacement based on the comparison.

15. A sugarcane harvester to cut sugarcane from a sugarcane field, the harvester comprising:
- a feed system to move the cut sugarcane to a chopping system, wherein the chopping system include a first chopper having first chopper blades and a second chopper having second chopper blades;
- a gearset operatively connected to the first chopper and to the second chopper;
- a motor operatively connected to the gearset;

a sensor operatively connected to the chopping system, wherein the sensor generates a speed signal to identify a rotational speed of one of the motor, the first chopper, or the second chopper;

a controller operatively connected to the sensor, wherein the controller receives the speed signal and compares the speed signal to a threshold; and a chopper timing actuator operatively coupled to the gearset, wherein the controller continuously controls the chopper timing actuator to adjust an angular displacement between the first chopper and the second chopper based on the comparison of the speed signal to the threshold.

16. The sugarcane harvester of claim 15 wherein the speed signal identifies a deceleration of the rotational speed of the first chopper during an interference between a first blade of the first chopper and a second blade of the second chopper.

17. The sugarcane harvester of claim 16 where in the deceleration identifies a time period during which the first blade interferes with the second blade.

18. The sugarcane harvester of claim 17 wherein the controller compares the time period of deceleration with a threshold time period and in response to the comparison transmits a timing chopper signal to the electric motor.

* * * * *